(12) United States Patent
Salvisberg

(10) Patent No.: US 7,299,688 B2
(45) Date of Patent: Nov. 27, 2007

(54) DEVICE AND METHOD FOR MAXIMIZING INTERNAL COMBUSTION ENGINE HORSEPOWER FOR A PRESELECTED RPM RANGE

(76) Inventor: Marc W. Salvisberg, 855 San Anselmo Ave., San Anselmo, CA (US) 94960

( * ) Notice: Subject to any disclaimer, the term of this patent is extended or adjusted under 35 U.S.C. 154(b) by 74 days.

(21) Appl. No.: 11/265,019

(22) Filed: Nov. 2, 2005

(65) Prior Publication Data
US 2007/0095323 A1 May 3, 2007

(51) Int. Cl.
*G01M 15/00* (2006.01)
(52) U.S. Cl. .................................................. 73/117.3
(58) Field of Classification Search .................. 73/112, 73/115, 116, 117.2, 117.3, 118.1, 118.2, 119 R
See application file for complete search history.

(56) References Cited

U.S. PATENT DOCUMENTS

| | | | |
|---|---|---|---|
| 4,066,720 A * | 1/1978 | Carter | 261/44.3 |
| 5,636,612 A * | 6/1997 | Brucato | 123/337 |
| 6,790,251 B1 * | 9/2004 | Brady, Jr. | 55/419 |
| 6,824,583 B2 * | 11/2004 | Bulger | 55/385.3 |
| 2003/0159413 A1 * | 8/2003 | Bulger | 55/385.3 |

\* cited by examiner

Primary Examiner—Eric S. McCall
(74) *Attorney, Agent, or Firm*—Cherskov & Flaynik (57) ABSTRACT

A device 10 and method for maximizing internal combustion engine horsepower for a preselected RPM range includes a plurality of velocity stacks 12 removably inserted via grommets 16 into apertures 17 in an air box portion 14 of the internal combustion engine while the air box portion 14 is secured to a throttle body portion of the internal combustion engine, and measuring power generated by the engine for the preselected RPM range with a selected velocity stack 12 removably secured to the air box portion 14 whereby a velocity stack 12 is ultimately selected that promotes maximum internal combustion engine horsepower for the preselected RPM range.

20 Claims, 7 Drawing Sheets

DEVICE AND METHOD FOR MAXIMIZING INTERNAL COMBUSTION ENGINE HORSEPOWER FOR A PRESELECTED RPM RANGE

BACKGROUND OF THE INVENTION

1. Field of the Invention

The present invention relates generally to maximizing internal combustion engine horsepower and, more particularly, to providing a plurality of velocity stacks varying in size and configuration to ultimately select velocity stacks that promote maximum internal combustion engine horsepower for a preselected revolutions per minute ("RPM") range.

2. Background of the Prior Art

Internal combustion engines develop horsepower directly proportional to air flow through a plurality of tubular air intake devices or "velocity stacks" disposed in an air box portion of the engine, the air box portion being secured to and on top of a carburetor or throttle body which controls air flow into the cylinders of the engine. Velocity stacks are manufactured from a single piece of rubber and include clamping and sealing features for attachment to the throttle body or carburetor. Internal combustion engines utilized for racing or constant operation at predetermined speeds, are calibrated or "tuned" to provide maximum horsepower in a relatively narrow RPM range.

One prior art method of engine tuning for maximum horsepower is to adjust air flow through the carburetor or throttle body via the velocity stacks. The configuration of preselected velocity stacks to adjust air flow may or may not be optimal for achieving maximum horsepower for an engine in a selected RPM range. To better tune the engine and increase horsepower for a selected RPM range, the air box is removed from the carburetor or throttle body, then one piece velocity stacks having configurations different then the existing velocity stacks, replace the existing velocity stacks. The air box is reattached to the carburetor or throttle body, then engine horsepower is measured (via a dynamometer or similar power measuring device) and compared to prior horsepower measurements for the same RPM range. If the horsepower measurements are higher, the replacement velocity stacks are utilized or the method is repeated by selecting another set velocity stacks having an unique configuration to replace the replacement velocity stacks. If the replacement velocity stacks reduce horsepower measurements for the selected RPM range, the original velocity stacks are reinstalled or another unique configured set of velocity stacks are installed. The method of velocity stack substitution is repeated until satisfactory horsepower readings are achieved.

One problem with the prior art method of selecting velocity stacks that promote maximum engine horsepower, is that the air box must be disconnected from the throttle body every time a velocity stack substitution occurs. The air box must then be re-attached to the throttle body with the newly selected velocity stacks secured to the air box. The horsepower output of the internal combustion engine is then measured by the dynamometer. The removal of the air box from the throttle body is time consuming, expensive and difficult.

Another problem with the prior art method is that due to the large amount of time required to substitute velocity stacks, the varying parameter between existing and substitute velocity stacks is the axial length. More specifically, the prior art time limitation prevents varying inner diameters and intake radii of substitute velocity stacks in combination with the varying of the axial length thereby preventing the optimization of velocity stack configuration and correspondingly reducing the generation of maximum engine horsepower.

A need exists for a device and method for maximizing internal combustion engine horsepower for a preselected RPM range via the substitution of velocity stacks without removing the air box from the throttle body when an existing velocity stack is replaced with a velocity stack varying in size and/or configuration. Further, a need exists for a device and method for maximizing engine horsepower by varying multiple parameters including, but not limited to axial length, inner diameters and intake radii. Another need exists for a device and method for maximizing engine horsepower by utilizing velocity stacks having a first portion that is removably secured to the air box thereby avoiding the removal of the air box from the throttle body or carburetor, and having a second portion that is removably secured to the first portion thereby promoting the fast substitution of varying velocity stack configurations.

SUMMARY OF THE INVENTION

It is a principle object of the present invention to provide a device for maximizing internal combustion engine horsepower for a preselected RPM range. A feature of the device is a plurality of velocity stacks for an air box portion of an internal combustion engine. An advantage of the device is that the velocity stacks may be interchanged without removing the air box portion from the internal combustion engine.

Another object of the present invention is to provide a device that includes a plurality of velocity stacks totaling a quantity greater than the quantity of apertures in the air box portion to which the velocity stacks are removably secured. A feature of the device is a large quantity of velocity stacks that are systematically substituted into apertures in a lower wall of the air box portion of the internal combustion engine; the selected velocity stacks promoting maximum internal combustion engine horsepower for a preselected RPM range. An advantage of the device is that the velocity stack substitution procedure is easily and inexpensively completed by an individual.

Yet another object of the present invention is to provide a device that removably secures the plurality of velocity stacks in the apertures in the air box. A feature of the device is a grommet or velocity stack adaptor having a lower portion that removably and snugly inserts into the apertures in a bottom wall of the air box, and having an upper portion that removably and snugly receives a bottom portion of a selected velocity stack. An advantage of the device is that the relatively expensive non-deformable velocity stacks need not be "specially" manufactured to snugly insert into the apertures. Another advantage of the device is that the grommets are fabricated from rubber or similar deformable material that "plugs" air gaps between the bottom portion of the velocity stack and the bottom wall of the air box.

Still another object of the present invention is to provide a device that alters air flow into a throttle body portion of the internal combustion engine. A feature of the device is varying edge configurations for the top portion of selected velocity stacks. The edge configurations include but are not limited to planar, knife and flared. The knife edge configuration promotes increased air flow adjacent to an inner wall of the velocity stack, but less air flow through the center of the velocity stack resulting in resonating pressure waves (which obstruct normal air flow) when sharp bends are encountered when air flows from the velocity stack into the throttle body. The knife edge configuration is preferred when a substantially "straight" air flow path to the throttle body is present. The flared edge configuration promotes less air flow around the velocity stack periphery, but more air flow through the center of the velocity stack resulting in reduced resonating pressure waves when sharp bends are encountered when air flows from the velocity stack into the throttle body. The planar edge configuration is utilized when air flow from the velocity stack to the throttle body encounters relatively large radius bends resulting in maximum air flow and minimum resonating pressure waves. An advantage of the device is that air flows from each velocity stack to the throttle body can be increased, thereby correspondingly increasing engine horsepower, by simply determining the configuration of the air flow path from the velocity stacks to the throttle body, then selecting the appropriate velocity stack edge configuration.

Another object of the present invention is to provide a device that determines if the internal combustion engine is producing more or less horsepower when a velocity stack is replaced. A feature of the device is an air flow meter for measuring air flow through the throttle body to determine if air flow has increased or decreased when a velocity stack replacement occurs. Throttle body air flow is directly proportional to horsepower developed by the internal combustion engine. An increase in throttle body air flow results in an increase in engine horsepower. Another feature of the device is a dynamometer for measuring horsepower developed by the internal combustion engine when a velocity stack replacement occurs. An advantage of the device is that by measuring throttle body air flow, velocity stacks are ultimately selected that result in the internal combustion engine providing maximum horsepower at a preselected RPM range; the throttle body air flow measurement being relatively inexpensive to determine but inaccurate when determining the velocity stack that maximizes engine horsepower. Another advantage of the device is that by using a dynamometer to directly measure developed horsepower, a more accurate measurement is provided to correspondingly select velocity stacks that result in maximum engine horsepower, but at a much greater expense.

Another object of the present invention is to provide a method for maximizing internal combustion engine horsepower for a preselected RPM range. A feature of the method is to provide a plurality of velocity stacks for an air box portion of the internal combustion engine. Another feature of the method is to vary the axial dimensions of the provided velocity stacks. Still another feature of the method is to vary the diameters of the provided velocity stacks. Yet another feature of the method is to vary the edge configurations of the provided velocity stacks. An advantage of the method is that provided velocity stacks varying in size and configuration are systematically inserted into apertures in a bottom wall of the air box portion of the internal combustion engine to ultimately select velocity stacks that result in maximum horsepower being developed by the internal combustion engine.

Still another object of the present invention is to provide a method for removably securing the velocity stacks to the air box portion while the air box portion is secured to the internal combustion engine. A feature of the method is a deformable grommet having a lower portion that removably inserts into an aperture in the bottom wall of the air box, and an upper portion that removably receives a lower portion of the velocity stack. An advantage of the method is that velocity stack substitution occurs without removing the air box portion from a throttle body thereby reducing the time and expensive required to determine engine horsepower resulting from each installed velocity stack.

Yet another object of the present invention is to provide a method for measuring power generated by the internal combustion engine for the preselected RPM range when one velocity stack is replaced by a velocity stack varying in size or configuration. A feature of the method is to provide a dynamometer for measuring horsepower developed by the internal combustion engine each time a velocity stack is replaced. An advantage of the method is that an accurate horsepower measurement corresponding to the inserted velocity stack is provided thereby enabling the selection of velocity stacks that promote maximum internal combustion engine horsepower for the preselected RPM range.

Briefly, the invention provides a method for maximizing internal combustion engine horsepower for a preselected RPM range, said method comprising the steps of providing a plurality of velocity stacks for an air box portion of the internal combustion engine; providing means for removably securing said velocity stacks to the air box portion while the air box portion is secured to the internal combustion engine; and measuring power generated by the internal combustion engine for the preselected RPM range with a selected set of velocity stacks removably secured to the air box portion whereby the selected set of velocity stacks removably secured to the air box portion whereby the selected set of velocity stacks removably secured to the air box portion whereby the selected set of velocity stacks promote maximum internal combustion engine horsepower for the preselected RPM range.

The invention further provides a device for tuning an internal combustion engine to a preselected RPM range comprising a plurality of velocity stacks having varying axial dimensions; means for removably securing a selected velocity stack to an air box portion of the internal combustion engine; and means for selecting velocity stacks that result in the internal combustion engine providing maximum power at the preselected RPM range.

The invention further provides a device for adjusting air flow for an internal combustion engine for maximizing engine horsepower for a preselected RPM range comprising a plurality of selected velocity stacks; means for removably securing said selected velocity stacks in apertures of an air box portion of the internal combustion engine; and means for measuring horsepower developed by the internal combustion engine for the preselected RPM range with said selected velocity stacks secured in the apertures of the air box portion.

BRIEF DESCRIPTION OF THE DRAWINGS

These and other objects, advantages and novel features of the present invention, as well as details of an illustrative embodiment thereof, will be more fully understood from the following detailed description and attached drawings, wherein.

DESCRIPTION OF THE PREFERRED EMBODIMENT

Figure 1:
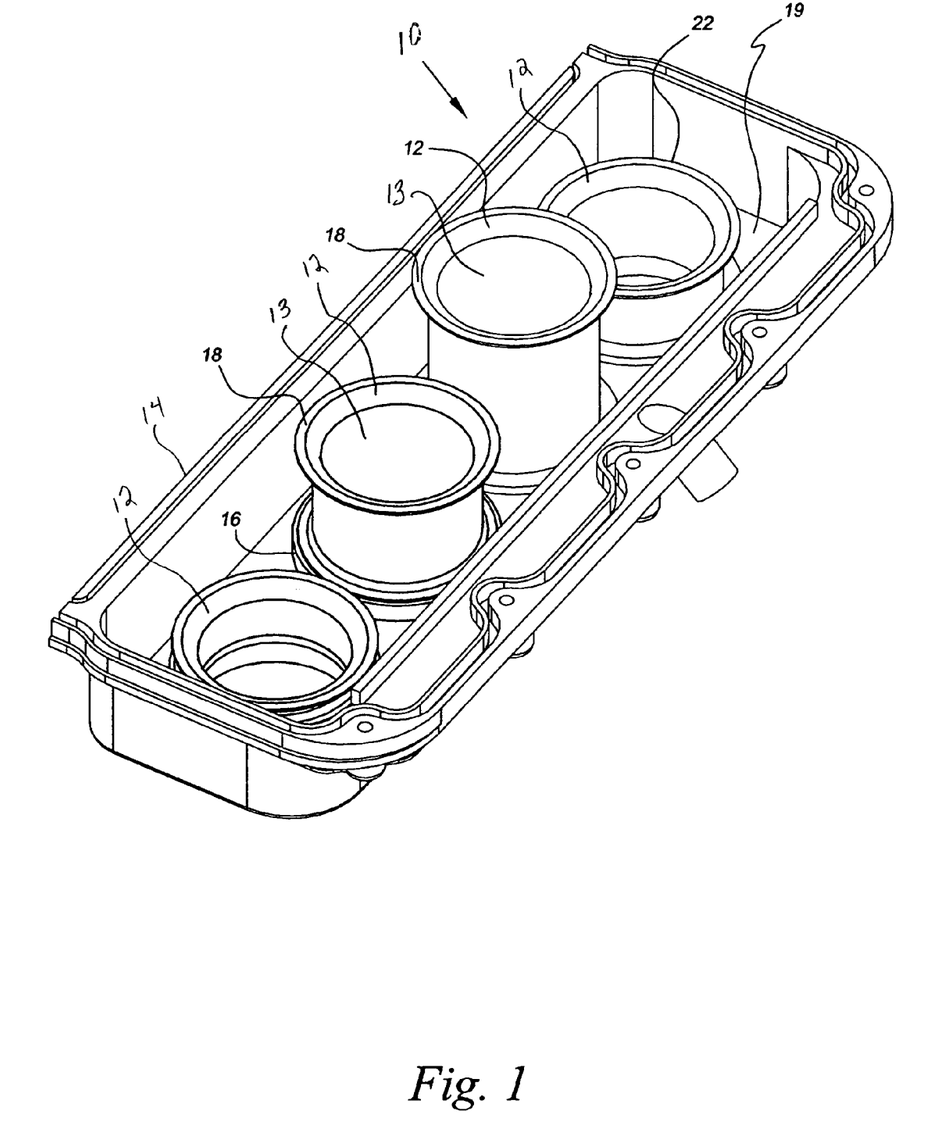
FIG. 1 is a perspective view of a device for maximizing internal combustion engine horsepower for a preselected RPM range in accordance with the present invention.
Figure 2:
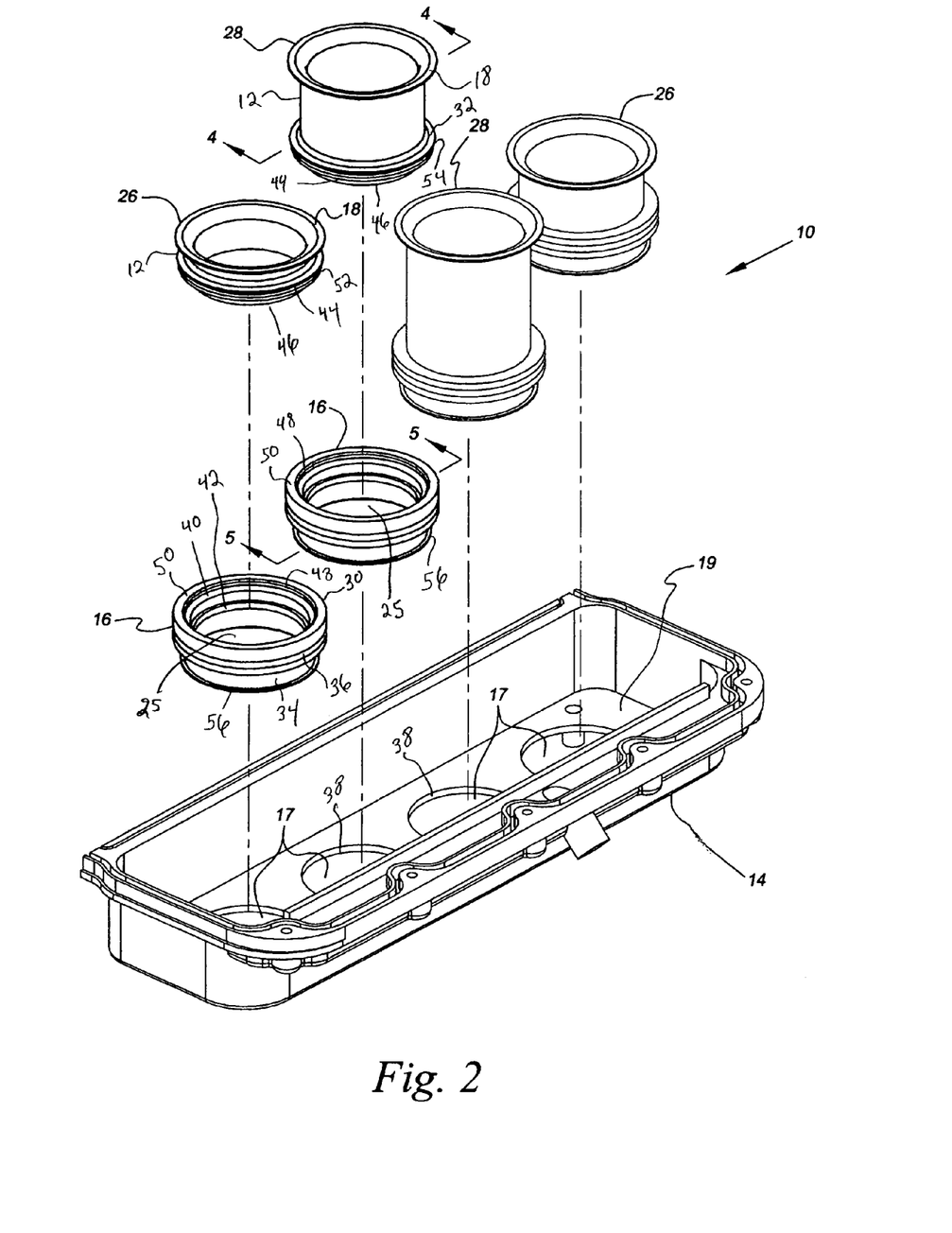
FIG. 2 is an exploded perspective view of the device of FIG. 1.
Figure 3:
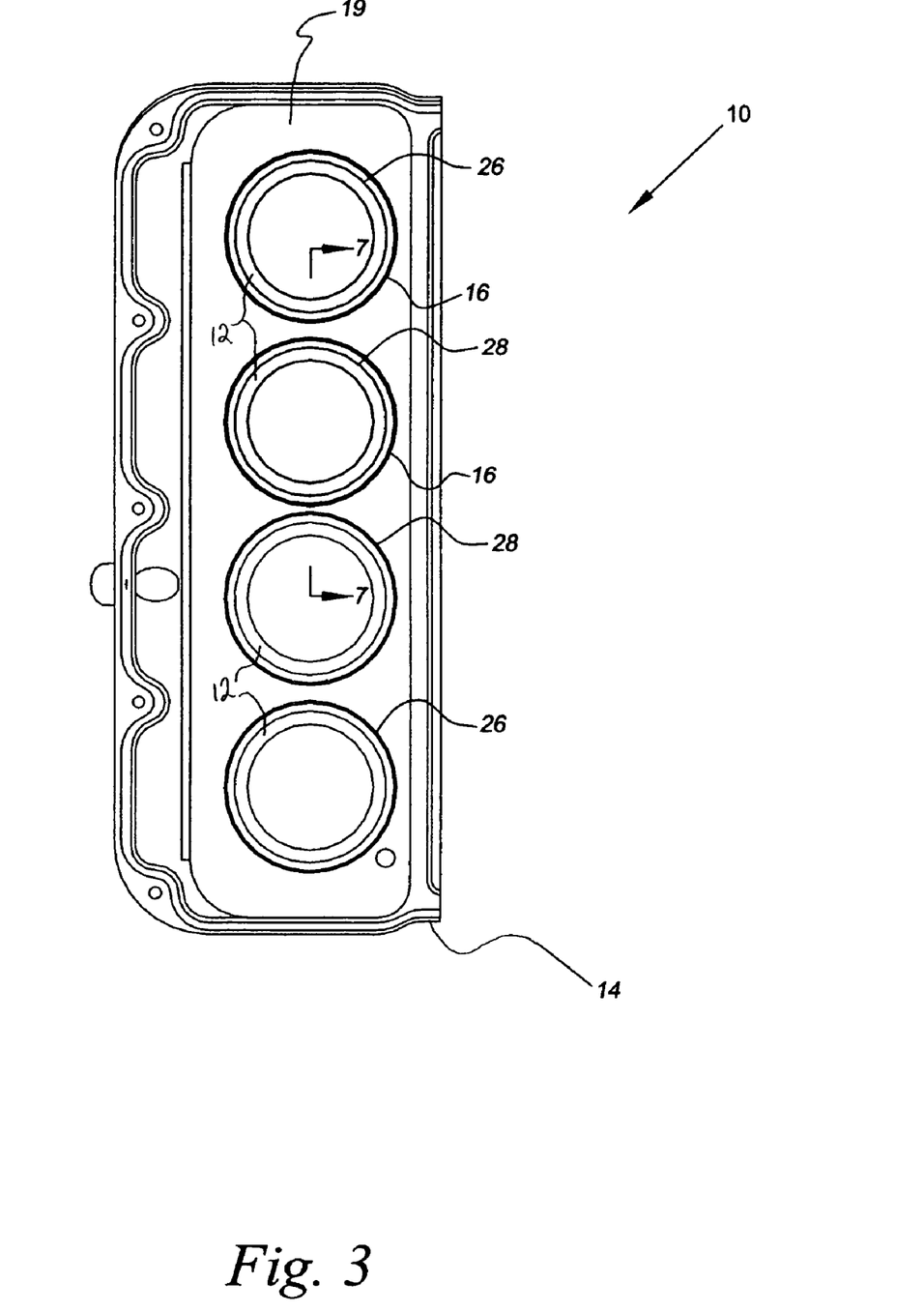
FIG. 3 is a top elevation view of the device of FIG. 1.

Referring now to the drawings, a device and method for maximizing internal combustion engine horsepower for a preselected RPM range in accordance with the present invention is denoted by numeral 10. The device 10 and method are primarily used for vehicles and in particular for motorcycles. The device 10 and method include providing a plurality of velocity stacks 12 for an air box portion 14 of an internal combustion engine (not depicted). The plurality of velocity stacks 12 total a quantity greater than the quantity of apertures 17 in the air box portion 14. The device 10 and method further includes grommets 16 for removably securing the velocity stacks 12 in the apertures 17 in the air box portion 14 while the air box portion 14 is secured to a throttle body portion (not depicted) of the internal combustion engine; and measuring power generated by the engine for the preselected RPM range with a selected velocity stack 12 removably secured to the air box portion 14 whereby the selected velocity stack 12 promotes maximum internal combustion engine horsepower for the preselected RPM range.

Figure 4:
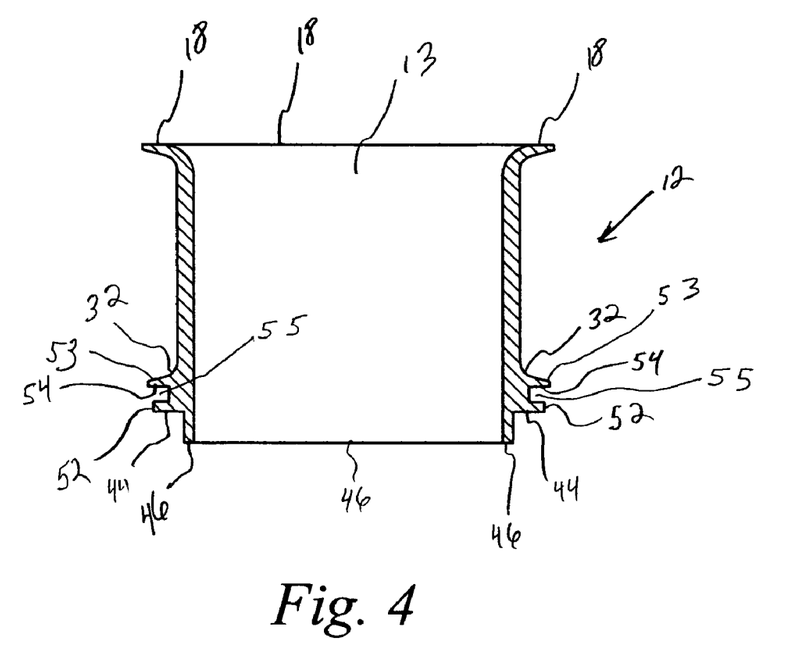
FIG. 4 is a sectional view of a velocity stack taken along line 4-4 of FIG. 2 in accordance with the present invention.

The velocity stacks 12 may be fabricated from a myriad of non-deformable materials including but not limited to rigid rubber, aluminum and chrome steel. The velocity stacks 12 are substantially cylindrically configured with air passages 13 therethrough, and vary in axial length ranging from substantially about fifteen to sixty millimeters in five millimeter increments. Irrespective of the axial length of each velocity stack 12, a minimum air gap of substantially about one-half inch must be maintained between a bottom wall of a top portion (not depicted) of the air box portion 14 and an edge portion 18 of all the velocity stacks 12 removably secured to a lower portion 19 of the air box portion 14. The air gap allows sufficient air flow to enter the velocity stack apertures to satisfy the air requirements of the internal combustion engine. The plurality of velocity stacks 12 include velocity stacks 12 with varying diameters and edge portion 18 configurations (see FIG. 4). The velocity stack diameters range from slightly smaller to slightly larger than the diameter of the apertures 17 in the lower portion 19 of the air box portion 14. The velocity stack edge configurations include planar 20, "knife edge" 22, and flared or rounded 24. Ultimately, a set of velocity stacks 12 are selected that maximize internal combustion engine horsepower by promoting a substantially air flow into the throttle body portion of the engine.

Figure 5:
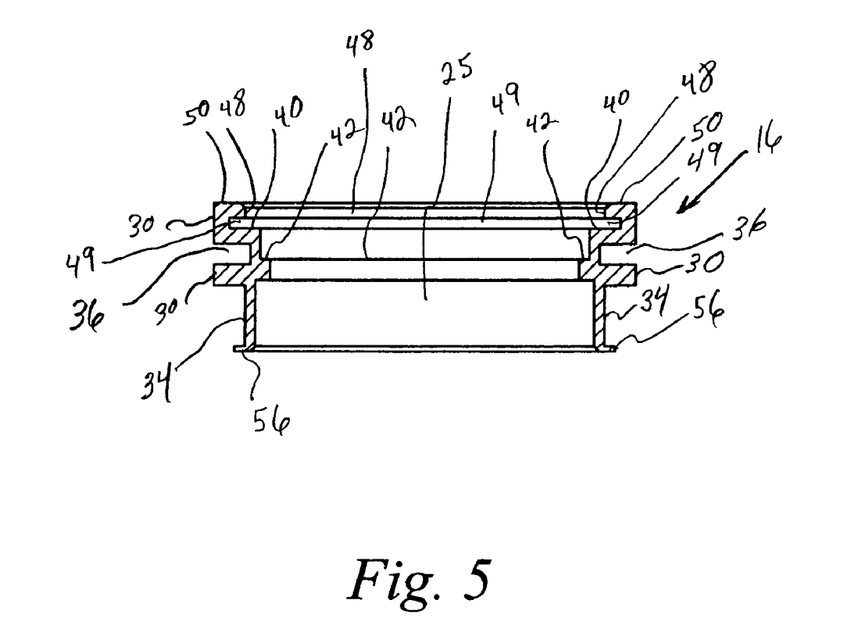
FIG. 5 is a sectional view of a velocity stack taken along line 5-5 of FIG. 2 in accordance with the present invention.
Figure 6:
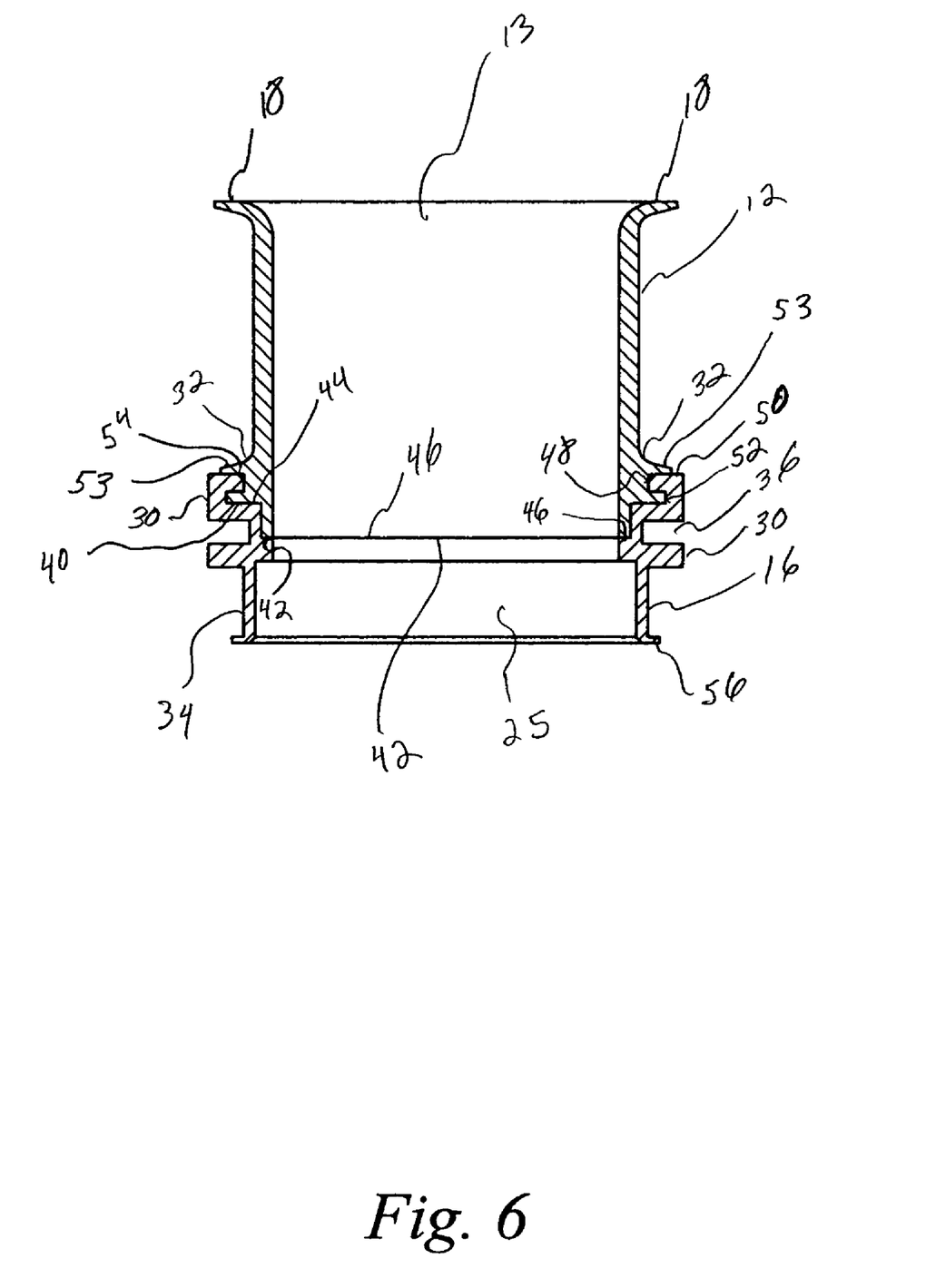
FIG. 6 is a sectional view of the velocity stack of FIG. 4 removably secured to the grommet of FIG. 5 in accordance with the present invention.
Figure 7:
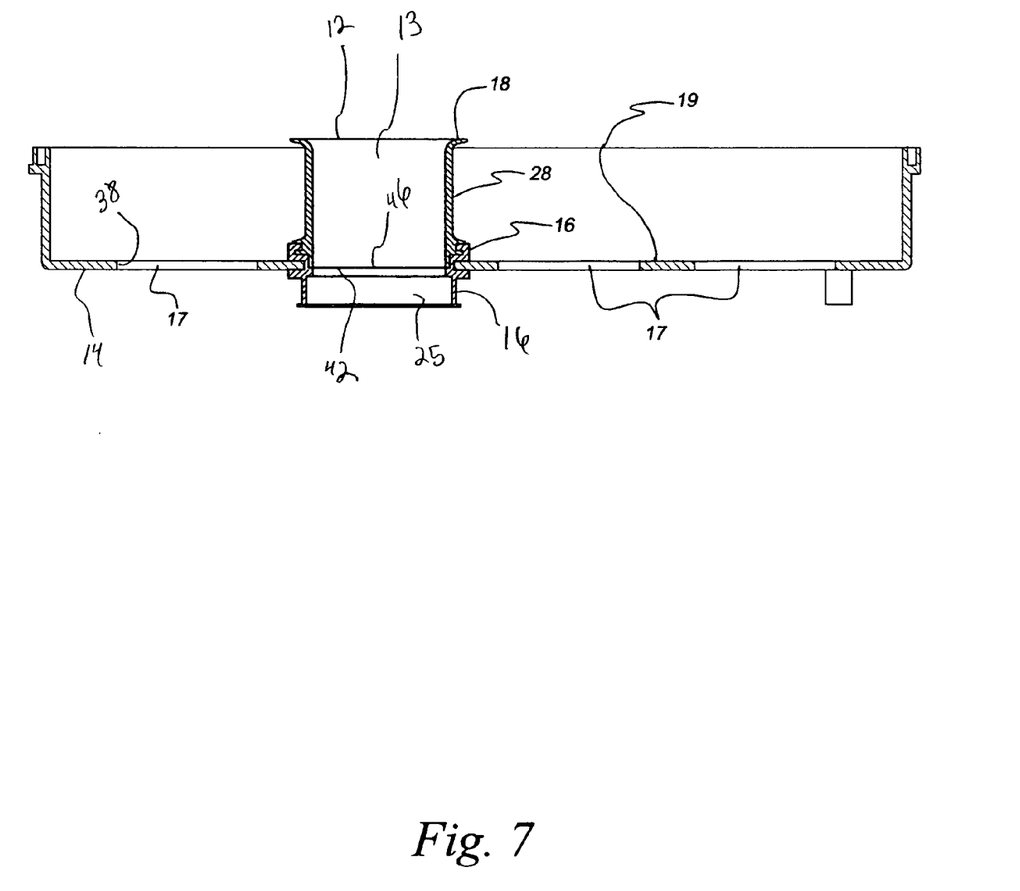
FIG. 7 is a sectional view of a velocity stack and grommet removably secured to a lower portion or bottom wall of an air box in accordance with the present invention.
Figure 8:
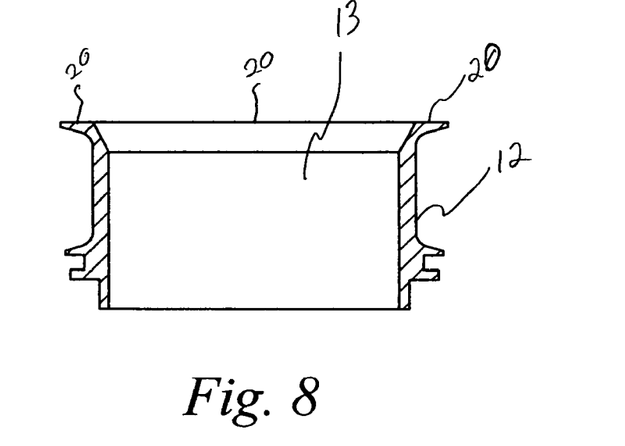
FIG. 8 is a sectional view of the velocity stack of FIG. 4, but with a planar edge configuration in accordance with the present invention.
Figure 9:
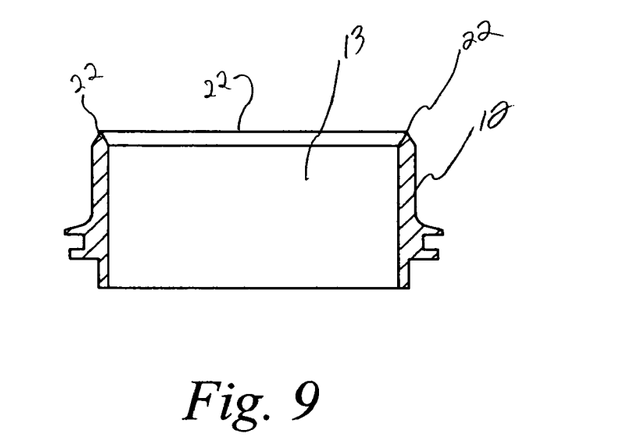
FIG. 9 is a sectional view of the velocity stack of FIG. 4, but with a "knife" edge configuration in accordance with the present invention.
Figure 10:
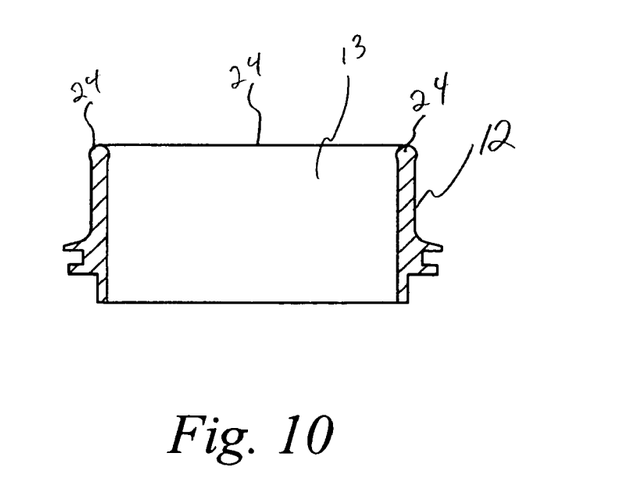
FIG. 10 is a sectional view of the velocity stack of FIG. 4, but with a flared or rounded edge configuration in accordance with the present invention.

The grommet 16 or velocity stack adaptor may be fabricated from rubber, plastic or similar deformable material that snugly secures the velocity stack 12 to the air box portion 14, that prevents air "leakage" between the velocity stack 12 and the air box portion 14, and that promotes a quick replacement of a first selected velocity stack 12 with a second selected velocity stack 12 of varying dimension or configuration. The grommet 16 is substantially cylindrically configured with an air passage 25 therethrough, and includes an upper portion 30 that removably and snugly receives a cooperating lower portion 32 of the velocity stack 12, and a lower portion 34 that is removably and snugly inserted through an aperture 17 in a bottom wall or lower portion 19 of the air box portion 14, the lower portion 34 ultimately engaging the throttle body portion of the internal combustion engine. The upper portion 30 of the grommet 16 includes an outer annular recess 36 that removably and snugly receives an edge portion 38 of the aperture 17 to promote an air seal between the grommet 16 and the lower portion 19 of the air box 14.

The upper portion 30 of the grommet 16 further includes first and second inner, planar annular walls 40 and 42 concentrically disposed and perpendicular to the central axis of the grommet 16 to congruently engage first and second outer, planar, concentrically disposed annular walls 44 and 46 of the velocity stacks 12, the walls 44 and 46 being disposed perpendicular to the central axis of the velocity stack 12 and parallel to the first and second walls 40 and 42 of the grommet 16. Respective first walls 40 and 44 are snugly engaged, and second walls 42 and 46 are snugly engaged thereby promoting a first air seal between the grommet 16 and the velocity stack 12.

The upper portion 30 of the grommet 16 further includes a protruding, cylindrical side wall 48 perpendicular to the first inner wall 40 and to a top wall 50 of the grommet 16. The side wall 48 is configured and dimensioned to cooperate with the first annular wall 40 to form a cylindrical recess 49 which removably and snugly receives a protruding lower cylindrical side wall 52 of the velocity stack 12. The velocity stack 12 includes a protuberance 53 that forms a planar, annular, bottom wall 54 configured and axially separated from the cylindrical side wall 52 sufficiently to form an annular recess 55 which removably and snugly receives the protruding side wall 48 of the grommet 16 thereby disposing the bottom wall 54 of the velocity stack 12 upon the top wall 50 of the grommet 16, promoting a second air seal between the velocity stack 12 and grommet 16, and interlocking the lower portion 32 of the velocity stack 12 with the upper portion 30 of the grommet 16 to prevent the unintended separation of the velocity stack 12 from the grommet 16.

The lower portion 34 of the grommet 16 includes an annular, planar bottom wall 56 that provides a planar surface that engages a corresponding portion of the throttle body to facilitate an air seal between the grommet 16 and the throttle body. The bottom wall 56 maintains engagement with the throttle body due to the air box 14 being joined to the throttle body, and the edge portion 38 of the bottom wall 19 of the air box 14 forcibly "grasping" the grommet 16 via the outer annular recess 36.

Power generated by the internal combustion engine for a preselected RPM range is measured directly via a dynamometer, or by operating the motorcycle on a test track and measuring motorcycle speed and RPM to determine engine power. Power generated by the engine may be measured indirectly by measuring air flow through the throttle body. Throttle body air flow is directly proportional to engine horsepower. Engine horsepower is recorded for the respective velocity stacks 12 secured to the air box portion 14. Selected velocity stacks 12 are replaced with velocity stacks 12 having different axial lengths. Internal combustion engine power is again measured and recorded to determine if the replacement velocity stacks 12 promote more or less engine power.

In operation, the method for maximizing motorcycle engine horsepower for a preselected RPM range can be utilized for new or used motorcycle engines. The method is based on an empirical or trial and error scheme that requires multiple substitutions of individual or sets of velocity stacks 12 removably secured to the lower portion 19 of the air box portion 14. Initially, the internal combustion engine horsepower is measured via a dynamometer in a specified RPM range corresponding to a power range required by an user. The top portion of the air box portion 14 is removed thereby exposing the originally installed velocity stacks 12. Multiple replacement velocity stacks 12 are then provided to tune or maximize the power output of the engine at the specified RPM by promoting a substantially laminar air flow and an air intake tract resonance into the throttle body portion of the internal combustion engine. The replacement velocity stacks 12 vary in axial length, diameter and edge portion 18 configuration.

After measuring engine horsepower, two outer originally installed velocity stacks 26 are replaced with velocity stacks 12 having five millimeter longer axial lengths. A second engine horsepower measurement is conducted with the dynamometer. If the second horsepower measurement is greater than the first measurement, the two outer velocity stacks 26 are replaced with velocity stacks 12 having five millimeter longer axial lengths (ten millimeters longer than the originally installed velocity stacks 12). A third engine horsepower measurement is conducted with the dynamometer. The replacement of the outer velocity stacks 26 with velocity stacks 12 of longer axial length continues until the measured horsepower decreases, whereupon, the outer velocity stacks 26 are replaced with the previous velocity stacks thereby promoting optimum air flow to the throttle body and maximum engine horsepower for the specified or preselected RPM range.

If the first longer axial length outer velocity stack 26 replacements had resulted in a loss of measured horsepower, outer velocity stacks 26 having axial lengths five millimeters shorter than the originally installed outer velocity stacks 26 would have been the first outer velocity stack 26 replacements. If the measured horsepower decreased, the originally installed outer velocity stacks 26 would be reinstalled as the optimum outer velocity stacks 26 for the specified RPM range. If the measured horsepower increased, the outer velocity stacks 26 would be replaced with velocity stacks 12 having five millimeter shorter axial lengths (ten millimeters shorter than the originally installed velocity stacks 12). The replacement of the outer velocity stacks 26 with velocity stacks 12 of shorter axial length continues until the measured horsepower decreases, whereupon, the outer velocity stacks 26 are replaced with the previous velocity stacks thereby promoting optimum air flow to the throttle body and maximum engine horsepower for the specified RPM range.

After selecting the optimum outer velocity stacks 26, the originally installed inner velocity stacks 28 are replaced with velocity stacks 12 having five millimeter longer axial lengths. The above replacement procedure is followed until inner velocity stacks 28 are selected that promote optimum air flow to the throttle body and maximum engine horsepower for the specified RPM range.

Upon selecting optimum outer and inner velocity stacks 26 and 28 with corresponding axial lengths, maximum motorcycle engine horsepower may be further increased by replacing the outer velocity stacks 26 with velocity stacks 12 of the same axial length, but with a five millimeter larger diameter. The above replacement procedure is followed by keeping the axial lengths constant, but varying the diameters of the replacement velocity stacks 12. Ultimately, optimum outer and inner velocity stacks 26 and 28 are selected with varying axial lengths and diameters for the specified RPM range.

Upon selecting optimum outer and inner velocity stacks 26 and 28 with corresponding axial and diameter lengths, maximum motorcycle engine horsepower may be further increased by replacing the outer velocity stacks 26 with velocity stacks 12 of the same axial and diameter lengths, but with different edge portion 18 configurations. The above replacement procedure is followed by keeping the axial and diameter lengths constant, but varying the edge portion 18 configuration between knife edge 20, planar 22 and flared 24. Ultimately, optimum outer and inner velocity stacks 26 and 28 are selected with varying axial and diameter lengths, and varying edge portion 18 configurations for the specified RPM range.

The above method can be used for any internal combustion engine with any number of originally installed velocity stacks 12, and for any RPM range. Although each internal combustion engine is unique, the quantity of horsepower measurements for a preselected engine can be reduced by replacing the velocity stacks 12 of the preselected engine with velocity stacks 12 identical to optimized velocity stacks 12 installed in a substantially similar internal combustion engine with the same RPM range. After replacing the provided velocity stacks 12 of the preselected engine with velocity stacks 12 identical to the velocity stacks 12 of the substantially similar internal combustion engine, a horsepower measurement is conducted for the preselected engine to determine if the engine's horsepower is equal to or greater than the horsepower of the substantially similar internal combustion engine. If the measured horsepower of the preselected engine is equal to or greater than the horsepower of the substantially similar engine, then optimum velocity stacks 12 have been installed. If the measured horsepower of the preselected engine is less than the horsepower of the substantially similar engine, then the velocity stack 12 substitution method detailed above must be initiated to discover the optimum velocity stacks 12 for the preselected engine at the specified RPM range.

After selecting optimum velocity stacks 12 for a preselected internal combustion engine for a specified RPM range, a device 10 can be fabricated for providing maximum horsepower for a substantially similar internal combustion engine operating at the identical RPM range. The device 10 would require minimal velocity stack 12 substitution and testing to "tune" the substantially similar internal combustion engine for maximum horsepower at the specified RPM range. The device 10 in accordance with the present invention includes a plurality of selected velocity stacks 12, a grommet 16 for removably securing the selected velocity stacks 12 in apertures 17 in an air box portion 14 of an internal combustion engine while the air box portion 14 is secured to a throttle body portion of the internal combustion engine, and means for measuring horsepower developed by the internal combustion engine for the preselected RPM range with the selected velocity stacks 12 secured in the apertures 17 of the air box portion 14.

While this invention has been described with reference to its presently preferred embodiment, it is not limited thereto. Rather, the invention is limited only insofar as it is defined by the following set of patent claims and includes within its scope all equivalents thereof.

The invention claimed is:

1. A method for maximizing internal combustion engine horsepower for a preselected RPM range, said method comprising the steps of:
   providing a plurality of individual velocity stacks for an air box portion of the internal combustion engine;
   providing means for removably and independently securing said individual velocity stacks to the air box portion while the air box portion is secured to the internal combustion engine, said securing means being deformable to prevent air leakage and to promote quick replacement of said individual velocity stacks;
   measuring power generated by the internal combustion engine for the preselected RPM range with a selected set of individual velocity stacks removably secured to the air box portion;
   providing a plurality of replacement individual velocity stacks for the air box portion of the internal combustion engine;
   replacing selected individual velocity stacks with selected individual replacement velocity stacks via said securing means while the air box portion is secured to the internal combustion engine; and
   measuring power generated by the internal combustion engine for the preselected RPM range with replacement individual velocity stacks removably secured to the air box portion, whereby the measured power corresponding to said selected set of individual velocity stacks is ultimately compared to measured power corresponding to said replacement individual velocity stacks, whereupon, velocity stacks that promote maximum internal combustion engine horsepower for the preselected RPM range are ultimately selected and secured to the air box portion, while secured to the internal combustion engine.

2. The method of claim 1 wherein the step of providing a plurality of velocity stacks includes the step of providing velocity stacks with different diameters.

3. The method of claim 1 wherein the step of providing a plurality of velocity stacks includes the step of providing velocity stacks with different edge dimensions.

4. The method of claim 3 wherein the step of providing velocity stacks with different edge dimensions includes the step of promoting a substantially laminar air flow into a throttle body portion of the internal combustion engine.

5. The method of claim 4 wherein the step of maintaining a substantially laminar air flow includes the step of configuring a flared edge for said velocity stack.

6. The method of claim 1 wherein the step of providing a plurality of velocity stacks includes the step of providing velocity stacks ranging in axial length from 15 to 60 millimeters.

7. The method of claim 1 wherein the step of providing a plurality of velocity stacks includes the step of providing velocity stacks with incremental axial lengths of 5 millimeters.

8. The method of claim 1 wherein the step of providing a plurality of velocity stacks includes the step of selecting a velocity stack having a predetermined axial length for a selected aperture in the air box portion of the internal combustion engine.

9. The method of claim 1 wherein the step of providing removable securing means includes the step of providing a grommet for snugly securing a selected velocity stack in a selected aperture in the air box portion thereby providing an air flow seal.

10. The method of claim 1 wherein the step of providing a plurality of velocity stacks includes the step of fabricating said velocity stacks from non-deformable materials.

11. The method of claim 1 wherein the step of measuring power generated by the internal combustion engine includes the step of providing a dynamometer.

12. The method of claim 1 wherein the step of providing a plurality of velocity stacks includes the step of maintaining a minimum air gap between a bottom wall of a top portion of the air box portion and an edge portion of said velocity stack.

13. The method of claim 12 wherein the step of maintaining a minimum air gap includes the step of maintaining substantially about a one-half inch air gap.

14. A device for tuning an internal combustion engine to a preselected RPM range comprising:
   a plurality of velocity stacks;
   means for removably securing said velocity stacks independently to an air box portion of the internal combustion engine;
   means for measuring power generated by the internal combustion engine for the preselected RPM range with said velocity stacks secured independently to the air box portion;
   at least one replacement velocity stack, said replacement velocity stack replacing a velocity stack after measuring the horsepower developed by the internal combustion engine for the preselected RPM range for said velocity stack;
   means for measuring power generated by the internal combustion engine for the preselected RPM range with said replacement velocity stack independently secured to the air box portion; and
   means for selecting either a velocity stack or a replacement velocity stack for installation in the air box portion, said selected velocity stack or replacement velocity stack resulting in maximum internal combustion engine horsepower for the preselected RPM range.

15. The device of claim 14 wherein said velocity stacks include varying diameters.

16. The device of claim 14 wherein said velocity stacks include varying axial dimensions.

17. The device of claim 14 wherein said velocity stacks include varying edge configurations.

18. A device for adjusting air flow for an internal combustion engine for maximizing engine horsepower for a preselected RPM range comprising:
   a plurality of selected velocity stacks;
   means for removably securing said selected velocity stacks independently in apertures of an air box portion of the internal combustion engine;
   means for measuring horsepower developed by the internal combustion engine for the preselected RPM range with said selected velocity stacks secured independently in the apertures of the air box portion;
   at least one replacement velocity stack, said replacement velocity stack replacing at least one selected velocity stack after measuring the horsepower developed by the internal combustion engine for the preselected RPM range with said selected velocity stacks secured independently in the apertures of the air box portion; and
   means for measuring horsepower developed by the internal combustion engine for the preselected RPM range with said replacement velocity stack secured independently in an aperture of the air box portion, whereby the measured power corresponding to said selected velocity stacks is ultimately compared to measured power corresponding to said replacement individual velocity stack, whereupon, velocity stacks that promote maximum internal combustion engine horsepower for the preselected RPM range are ultimately selected and secured to the air box portion, which is secured to the internal combustion engine.

19. The device of claim 18 wherein said velocity stacks include means for maintaining a substantially laminar air flow into a throttle body portion of the internal combustion engine.

20. The device of claim 18 wherein said measuring means includes a dynamometer.

* * * * *